United States Patent
Nakagawa

(10) Patent No.: US 7,692,574 B2
(45) Date of Patent: Apr. 6, 2010

(54) RADAR APPARATUS

(75) Inventor: Kado Nakagawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 48 days.

(21) Appl. No.: 12/042,588

(22) Filed: Mar. 5, 2008

(65) Prior Publication Data

US 2009/0073026 A1 Mar. 19, 2009

(30) Foreign Application Priority Data

Sep. 18, 2007 (JP) .............................. 2007-241003

(51) Int. Cl.
*G01S 13/58* (2006.01)
(52) U.S. Cl. ...................................... 342/107; 342/147
(58) Field of Classification Search ................... 342/194
See application file for complete search history.

(56) References Cited

U.S. PATENT DOCUMENTS

| | | | | |
|---|---|---|---|---|
| 6,121,917 A * | 9/2000 | Yamada | ...................... | 342/128 |
| 6,664,920 B1 * | 12/2003 | Mott et al. | ................... | 342/129 |
| 6,795,012 B2 * | 9/2004 | Nakanishi et al. | ............. | 342/70 |
| 2002/0171584 A1 * | 11/2002 | Walker et al. | ............... | 342/368 |
| 2002/0180633 A1 * | 12/2002 | Nakanishi et al. | ............. | 342/70 |
| 2005/0083227 A1 * | 4/2005 | Takano et al. | ................. | 342/70 |

FOREIGN PATENT DOCUMENTS

JP 11-133142 A 5/1999

OTHER PUBLICATIONS

Ralph O. Schmidt, "Multiple Emitter Location and Signal Parameter Estimation", IEEE Transactions on Antennas and Propagation, Mar. 1986, pp. 276-280, vol. AP-34, No. 3.

* cited by examiner

*Primary Examiner*—Thomas H Tarcza
*Assistant Examiner*—Timothy A Brainard
(74) *Attorney, Agent, or Firm*—Sughrue Mion, PLLC

(57) ABSTRACT

A radar apparatus can improve detection performance of a target, obtain high resolution without changing antenna construction, and suppress calculation load. A target detection unit, which calculates a distance, a relative speed, or a direction of the target based on frequency analysis results for a plurality of channels, includes a channel to channel integration unit that integrates, for each of the same frequencies, beat frequency spectra for the plurality of channels in the form of frequency analysis results for beat signals obtained for each of a plurality of receiving antennas, and a direction calculation unit that calculates the direction of the target from the beat frequency spectra for the plurality of channels.

5 Claims, 10 Drawing Sheets

FIG. 9
(a)
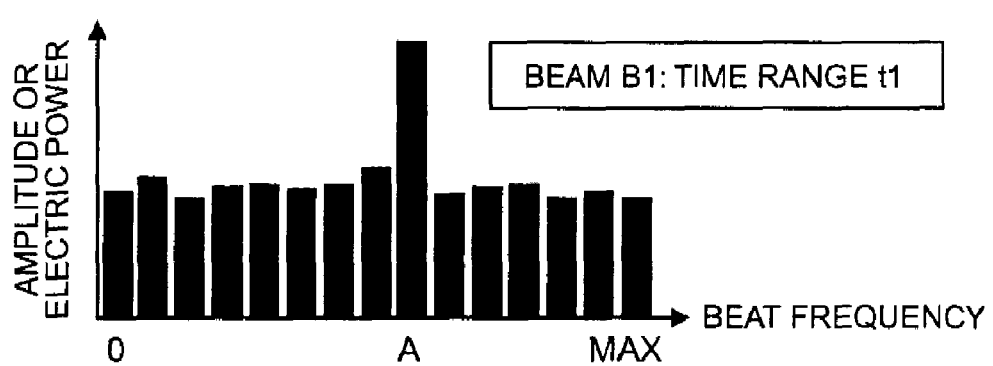
(b)
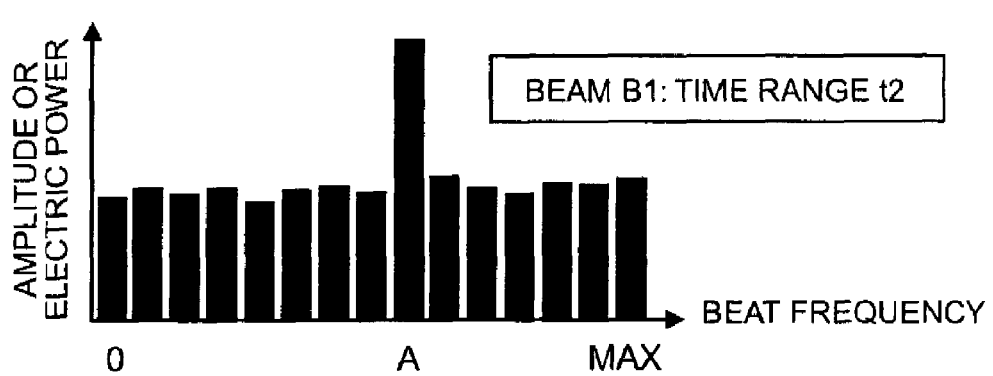

RADAR APPARATUS

BACKGROUND OF THE INVENTION

1. Field of the Invention

The present invention relates to a radar apparatus that calculates target information based on a reflection signal which is reflected from an object to be detected (hereinafter referred to as a "target") and which is received by a plurality of receiving elements when a transmitting signal (radio wave) is radiated to the target.

2. Description of the Related Art

Conventionally, as a radar apparatus capable of calculating a distance and a relative speed to a target, there has been known a frequency modulation radar apparatus that sends a transmitting signal with its frequency modulated to the target in a continuous or successive manner, receives a reflection signal from the target, and calculates the distance and the relative speed with respect to the target based on the reflection signal thus received.

As a target direction calculation method in such a kind of radar apparatus, there has been known a method for calculating the direction of a target by scanning a transmitting signal while swinging a transmitting unit in a mechanical manner. In addition, there has also been known a digital beam forming (Digital Beam Forming, hereinafter being referred to as "DBF") synthetic processing that calculates the direction of a target by outputting a transmitting signal without mechanically swinging a transmitting unit, and by performing digital signal processing on reception signals which are received by an antenna in the form of an array having a plurality of channels (see, for example, a first patent document: Japanese patent application laid-open No. H11-133142).

The DBF synthetic processing is a method of calculating the direction of a target by producing an angular spectrum from the received signals that are obtained from individual channels of an array antenna comprising a plurality of channels, and detecting a peak of the angular spectrum.

In particular, in the technique disclosed in the first patent document, an angular spectrum is calculated by performing the DBF synthetic processing on the signals received by the frequency modulation radar apparatus, and the direction of the target is calculated based on the angular spectrum thus obtained.

In the technique described in the first patent document, the DBF synthetic processing is not performed on all the frequencies of the received signals, but only on the frequencies, of which the amplitude is greater than a predetermined value, in the beat frequency spectrum that is obtained by applying a frequency analysis to the received signals, whereby the amount of calculations to obtain the direction of the target can be reduced.

In addition, super-resolution direction-of-arrival estimation processing such as a MUSIC (Multiple Signal Classification) method, etc., is known as a method for calculating the direction of a target by outputting a transmitting signal to a target without mechanically swinging a transmitting unit, and by performing digital signal processing on signals that are reflected from the target and received by an array antenna having a plurality of channels (see, for example, the following first non-patent document).

R. O. Schmidt, "Multiple Emitter Location and Signal Parameter Estimation", IEEE Trans. AP-34, No. 3, pp. 276-280 (1986)

The MUSIC method is a method of calculating a covariance matrix, performing an eigenvalue decomposition of the covariance matrix so as to obtain eigenvectors, calculating an angular spectrum from the eigenvectors, and calculating the direction of a target from the angular spectrum.

In the beat frequency spectrum before the DBF synthetic processing in the conventional radar apparatus, there has been a problem that when the RCS (Radar Cross Section) of a target is small or a target is at a distance, it becomes difficult to detect a peak resulting from the target.

More specifically, according to the method of performing the DBF synthetic processing only on the frequencies, of which the amplitude is greater than the predetermined value, in the beat frequency spectrum obtained by applying the frequency analysis to the received signals, as in the first patent document, there has been a problem that if the RCS of a target is small or a target is far away, it might be impossible to detect the target.

In addition, in the technique for calculating the direction of the target by using the DBF synthetic processing, as in the first patent document, there is also a problem that the construction of the antenna has to be changed in order to obtain a high degree of resolution.

On the other hand, according to the super-resolution direction-of-arrival estimation processing described in the above-mentioned first non-patent document, a high degree of resolution can be obtained without changing the construction of the antenna, but a great number of calculations is required for calculating a covariance matrix with respect to all the frequencies of the beat frequency spectrum of each antenna, performing an eigenvalue decomposition of the covariance matrix to obtain eigenvectors, and deriving an angular spectrum from the eigenvectors. As a result, there is a problem that the huge amount of calculations is necessary as compared with the case in which only an angular spectrum of limited frequencies is calculated, thus resulting in a substantial increase in the calculation load.

SUMMARY OF THE INVENTION

Accordingly, the present invention is intended to obviate the problems as referred to above, and has for its object to obtain a radar apparatus which is capable of detecting a target having a small RCS or a target existing at a distance.

Another object of the present invention is to obtain a radar apparatus which is capable of achieving high resolution without changing antenna construction, and in which the calculation load is small.

Bearing the above objects in mind, a radar apparatus according to the present invention includes: a transmitting unit that emits a transmitting signal; a receiving unit that receives a reflection signal, which is the transmitted signal reflected from a target, by means of an array antenna having a plurality of channels; a mixing unit that mixes the transmitting signal and reception signals received by the plurality of channels of the receiving unit, respectively, to obtain beat signals for the plurality of channels; a frequency analysis unit that frequency analyzes the beat signals for the plurality of channels, respectively; and a target detection unit that calculates a distance, a relative speed, or a direction of the target based on frequency analysis results for the plurality of channels. The target detection unit includes: a channel to channel integration unit that integrates, at each of the same frequencies, beat frequency spectra for the plurality of channels in the form of frequency analysis results of the beat signals for the plurality of channels which are calculated in a predetermined time range; and a direction calculation unit that calculates the direction of the target from the beat frequency spectra for the plurality of channels.

According to the present invention, as a method for calculating the direction of a target, there is employed super-resolution direction-of-arrival estimation processing instead of DBF synthetic processing, so it is possible to obtain a high degree of resolution without changing antenna construction.

In addition, in case where the RCS of a target is small (or a target is at a distance), even if a peak of a beat frequency spectrum resulting from a target is buried in the beat frequency spectrum before the channel to channel integration thereof, it is possible to improve the gain of signals by executing channel to channel integration over the entire range of the frequencies of the beat frequency spectrum. Accordingly, the detection performance of the target can be improved, thus making it possible to detect a peak beat frequency in a correct manner.

Further, in the beat frequency spectrum before the channel to channel integration thereof, the direction of the target is obtained by calculating the angular spectrum only for the peak beat frequency resulting from the target, so it is possible to decrease the calculation load in comparison with the case in which the direction of the target is obtained by calculating the angular spectrum over the entire frequency range.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 9 is explanatory views showing the same frequency addition processing in case of two channels according to the third embodiment of the present invention.

DESCRIPTION OF THE PREFERRED EMBODIMENTS

Hereinafter, preferred embodiments of the present invention will be described in detail while referring to the accompanying drawings.

Embodiment 1

Figure 1:
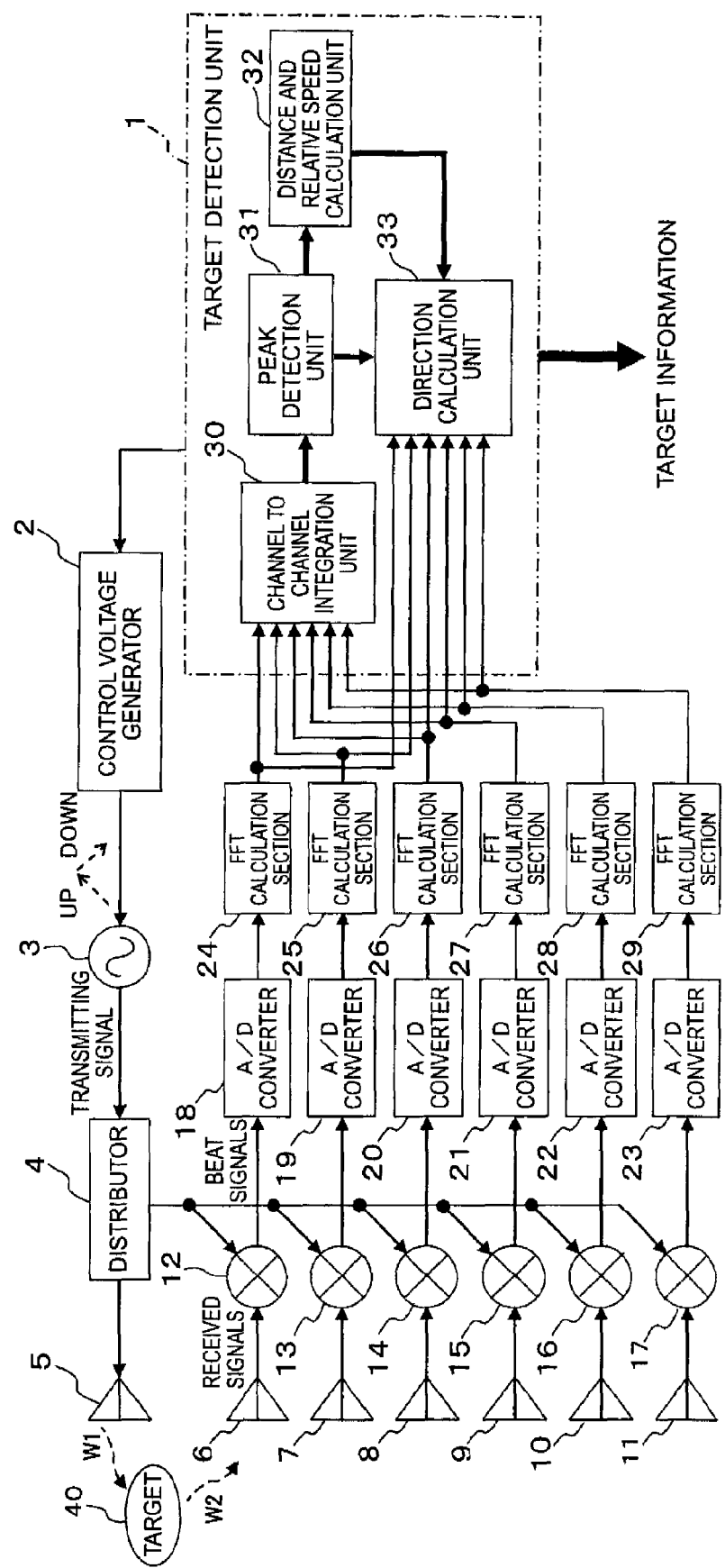
FIG. 1 is a block diagram showing a radar apparatus according to a first embodiment of the present invention.

Referring to the drawings and first to FIG. 1, there is shown, in a block diagram, a radar apparatus according to a first embodiment of the present invention.

In FIG. 1, the radar apparatus includes a target detection unit 1 in the form of a microcomputer, a control voltage generator 2 that outputs a control voltage under the control of the target detection unit 1, a VCO (Voltage Controlled Oscillator) 3 that outputs a transmitting signal with its frequency up/down modulated based on the control voltage, a distributor 4 that distributes a transmitting signal, and a transmitting antenna 5 (transmitting unit) that emits a transmitting signal W1 to a target 40 which may comprise a single target component or a plurality of target components.

In addition, the radar apparatus further includes a plurality of receiving antennas 6 through 11 (receiving unit) in the form of an array having a plurality of channels (e.g., 6 channels) for receiving a reflection signal W2 which is the transmitting signal W1 reflected by the target 40, a plurality of mixers 12 through 17 (a mixing unit) that mix the received signals received by the plurality of channels of the receiving antennas 6 through 11 and the transmitting signal distributed thereto by the distributor 4, respectively, to obtain beat signals for the plurality of channels, a plurality of A/D converters 18 through 23 that respectively convert the beat signals for the plurality of channels from analog into digital form, a plurality of FFT (Fast Fourier Transform) calculation units 24 through 29 (frequency analysis unit) that frequency analyze the beat signals for the plurality of channels, respectively.

The frequency analysis results (beat frequency spectra for the plurality of channels) of the beat signals for the plurality of channels from the FFT calculators 24 through 29 are input to the target detection unit 1.

The target detection unit 1 performs DBF synthetic processing on the frequency analysis results for the plurality of channels, calculates the distance, the relative speed or the direction of the target 40, and outputs them to an external device (not shown) as target information.

In order to obtain the above-mentioned target information, the target detection unit 1 includes a channel to channel integration unit 30 that integrates, at each of the same frequencies, the frequency analysis results (the beat frequency spectra for the plurality of channels) of the beat signals for the plurality of channels which are calculated in a predetermined time range, a peak detection unit 31 that detects a peak beat frequency from the integral calculation result of the channel to channel integration unit 30, a distance and relative speed calculation unit 32 that calculates a distance R and a relative speed V of the target 40 based on the peak beat frequency, and a direction calculation unit 33 that calculates a direction θ of the target 40 from the beat frequency spectra for the plurality of channels, the distance R and the relative speed V of the target 40.

The channel to channel integration unit 30 performs the DBF synthetic processing on the beat frequency spectra for the plurality of channels (the frequency analysis results of the beat signals).

Hereinafter, reference will be made to the operation of the first embodiment of the present invention, as shown in FIG. 1.

First of all, when a modulation start command is output from the target detection unit 1 to the control voltage generator 2, a triangular (up/down) control voltage is applied from the control voltage generator 2 to the VCO (Voltage Controlled Oscillator) 3. The VCO 3 outputs a transmitting signal that is frequency modulated into a signal of an up/down frequency in accordance with the control voltage.

The transmitting signal is distributed to the transmitting antenna 5 and the mixers 12 through 17 through the distributor 4, so that it is emitted from the transmitting antenna 5 toward the target 40.

On the other hand, the reflection signal W2 reflected by the target 40 is received by the plurality of (e.g., six) receiving antennas 6 through 11 as received signals for six channels (CH1 through CH6), which are then mixed with the transmitting signal by means of the individual mixers 12 through 17, respectively.

As a result, beat signals for the six channels are produced from the mixers 12 through 17, respectively, and the individual beat signals are converted into corresponding pieces of digital data by means of the A/D converters 18 through 23, respectively, with respect to an up zone in which the frequencies rise along with the elapse of time, and a down zone in which the frequencies fall along with the elapse of time, respectively.

The individual pieces of digital data produced from the A/D converters 18 through 23 are subjected to frequency analyses individually using FFTs by means of the FFT calculators 24 through 29 (frequency analysis unit), respectively.

The frequency analysis results (beat frequency spectra) for the six channels calculated by the FFT calculators 24 through 29 for each of the up zone and the down zone are input to the target detection unit 1.

In the target detection unit 1, first of all, the channel to channel integration unit 30 produces a beam having a prescribed angular pitch by performing DBF synthetic processing on the beat frequency spectra for the six channels calculated at the FFT calculators 24 through 29.

Subsequently, the peak detection unit 31 detects a peak beat frequency from the beat frequency spectra after the execution of the DBF synthetic processing.

In addition, the distance and relative speed calculation unit 32 calculates the distance and the relative speed of the target 40 from the peak beat frequency. At this time, impossible calculated values for the distance or the relative speed are not assumed as information on the target 40, and are excluded.

Finally, the direction calculation unit 33 calculates the direction θ of the target 40 by applying super-resolution direction-of-arrival estimation processing on the beat frequency spectra before the DBF synthetic processing corresponding to the peak beat frequency used to calculate the distance and the relative speed. Here, it is assumed that the above-mentioned MUSIC method is used as the super-resolution direction-of-arrival estimation processing.

Specifically, the direction calculation unit 33 produces a covariance matrix with respect to the beat frequency spectra for the plurality of channels, and calculates the directions or the number of target components of the target 40 from the eigenvalues and eigenvectors of the covariance matrix, as will be described later.

Now, specific reference will be made to the operation of the target detection unit 1 shown in FIG. 1 while referring to FIG. 2 through FIG. 4.

Figure 2:
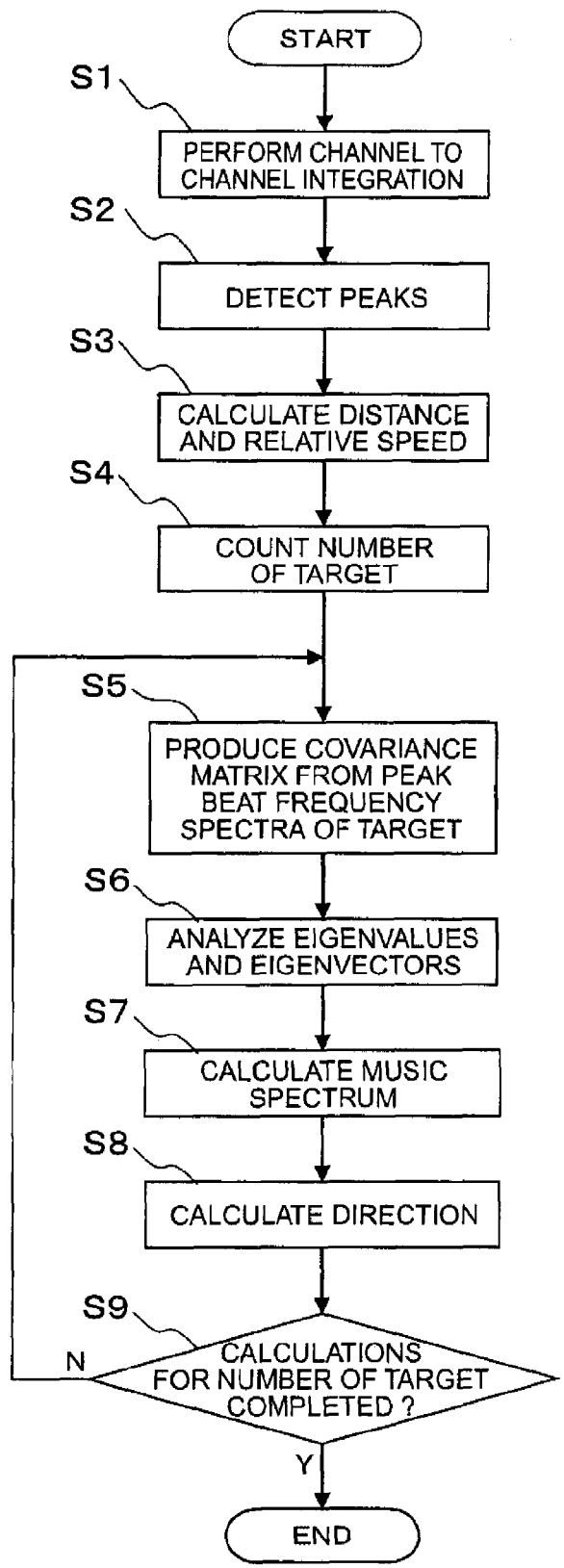
FIG. 2 is a flow chart illustrating the operation of a target detection unit according to the first embodiment of the present invention.

FIG. 2 is a flow chart that illustrates an operation procedure of the target detection unit 1. FIG. 3 is explanatory views that show the processing in step S2 in FIG. 2, wherein the amplitudes of the beat frequency spectra of beams (i.e., typical beams B1, B4, B8 of all eight beams B1 through B8) after the DBF synthetic processing are illustrated. In addition, FIG. 4 is an explanatory view that shows the processing in step S8 in FIG. 2, wherein one example of a MUSIC spectrum is illustrated.

In FIG. 2, first of all, the channel to channel integration unit 30 performs the DBF synthetic processing on the beat frequency spectra for the six input channels (step S1).

In the DBF synthetic processing (step S1) by the channel to channel integration unit 30, the beat frequency spectra for the six channels calculated by the FFT calculators 24 through 29 are further Fourier transformed in a spatial axis direction at each of the same frequencies, whereby a preset number of antenna beams are formed. In this regard, it is to be noted that the step S1 is a basic step of the DBF synthetic processing, which has already been published in a variety of well-known documents, and hence a detailed description thereof is omitted here.

Subsequently, the peak detection unit 31 detects peaks from the beat frequency spectra after the DBF synthetic processing obtained in step S1 (step S2). Specifically, when the number of up/down beams is eight (B1 through B8), as shown in FIG. 3, a detection threshold is provided for the amplitude of the beat frequency spectrum of each beam after the DBF synthetic processing, and an amplitude, which is larger than the detection threshold and at the same time larger than the amplitudes of beat frequencies before and after the frequency of that amplitude, is determined as a peak.

Figure 3:
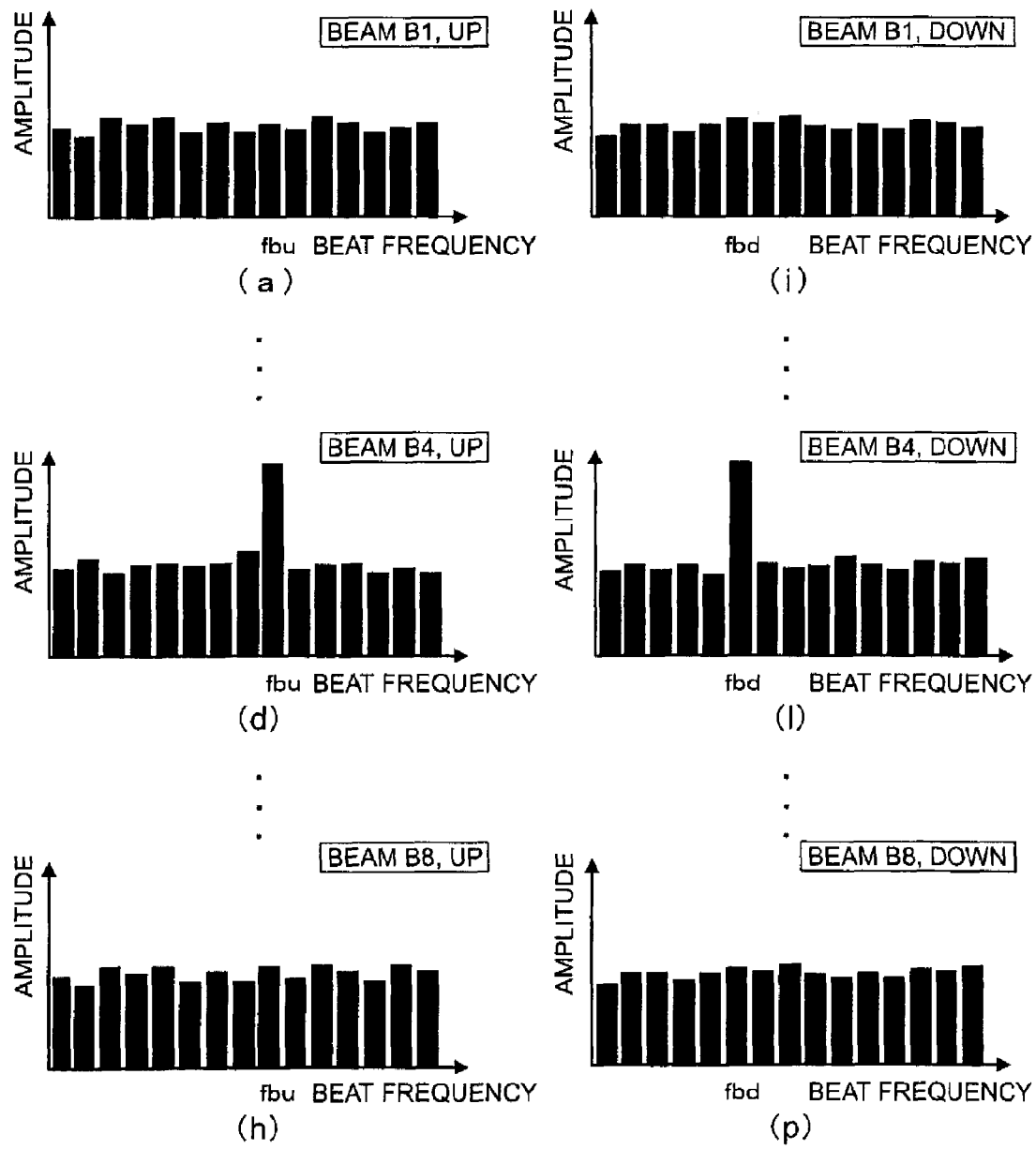
FIG. 3 is explanatory views showing the amplitudes of beat frequency spectra of individual beams after the execution of DBF synthetic processing according to the first embodiment of the present invention.
Figure 4:
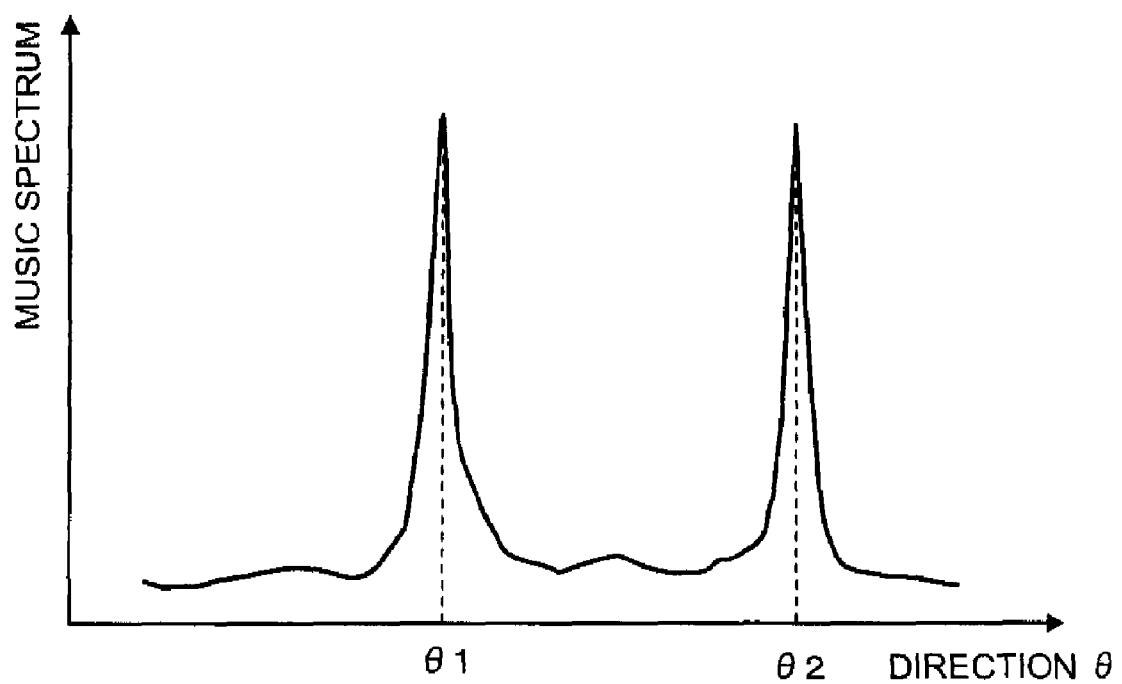
FIG. 4 is an explanatory view schematically illustrating the processing of a MUSIC spectrum according to the first embodiment of the present invention.

In FIG. 3, (a) through (h) represent the individual beat frequency spectra of the beams B1 through B8 at an up time in FIG. 3, and (i) through (p) represent the individual beat frequency spectra of the beams B1 through B8 at a down time, wherein the axis of ordinate represents the beat frequency, and the axis of abscissa represents the amplitude in each view of FIG. 3.

In addition, a peak beat frequency of which the amplitude has become a peak in the up zone is denoted by "fbu", and a peak beat frequency of which the amplitude has become a peak in the down zone is denoted by "fbd".

Reverting to FIG. 2, subsequently, the distance and relative speed calculation unit 32 calculates the distance R and the relative speed V of the target 40 from the peak beat frequencies fbu, fbd obtained in step S2 based on the principle of general FMCW (Frequency Modulation Continuous Wave) radar (step S3).

That is, the distance R of the target 40 is calculated by the following expression (1).

$$R = \frac{cT}{4f_m}(f_{bu} + f_{bd}) \qquad (1)$$

Also, the relative speed V of the target 40 is calculated according to the following expression (2).

$$V = -\frac{c}{4f_c}(f_{bu} - f_{bd}) \qquad (2)$$

Here, note that in expressions (1) and (2) above, c is the speed of light, T is one modulation time, fm is a frequency modulation width, and fc is a carrier frequency.

Subsequently, the distance and relative speed calculation unit 32 counts and stores the number of target (i.e., target components) 40 calculated (step S4), and the direction calculation unit 33 produces a covariance matrix Rc for use with the MUSIC method (step S5). The covariance matrix Rc is an order of 6×6, and is represented by the following expression (3).

$$R_c = \begin{bmatrix} X_1 \cdot X_1^* & X_1 \cdot X_2^* & \ldots & X_1 \cdot X_6^* \\ X_2 \cdot X_1^* & X_2 \cdot X_2^* & \ldots & X_2 \cdot X_6^* \\ \vdots & \vdots & \ddots & \vdots \\ X_6 \cdot X_1^* & X_6 \cdot X_2^* & \ldots & X_6 \cdot X_6^* \end{bmatrix} \quad (3)$$

Here, in expression (3) above, Xi is a beat frequency spectrum before the DBF synthetic processing of a peak beat frequency fbu in the i-th channel CHi (i=1, . . . , 6), and Xi* is a complex conjugate of the beat frequency spectrum Xi.

In addition, the direction calculation unit 33 obtains eigenvalues $\lambda_1$ through $\lambda_6$ and their corresponding eigenvectors $e_1$ through $e_6$, respectively, by performing an eigenvalue and eigenvector analysis on the covariance matrix Rc (step S6).

Then, the direction calculation unit 33 calculates an angular spectrum Pm(θ) (MUSIC spectrum) based on a general MUSIC method according to the following expression (4) by using the eigenvalues $\lambda_1$ through $\lambda_6$ and the eigenvectors $e_1$ through $e_6$ (step S7).

$$P_m(\theta) = \frac{\|a(\theta)\|^2}{\sum_{i=K+1}^{6} |e_i^H a(\theta)|^2}, \quad a(\theta) = \begin{bmatrix} 1 \\ \exp(j\Delta\varphi) \\ \exp(j2\Delta\varphi) \\ \exp(j3\Delta\varphi) \\ \exp(j4\Delta\varphi) \\ \exp(j5\Delta\varphi) \end{bmatrix}, \quad \Delta\varphi = 2\pi\frac{d}{\lambda}\sin\theta \quad (4)$$

Here, note that in expression (4) above, $ei^H$ is a complex conjugate transposition of an eigenvector ei, and K is a number of incident signals, λ is a wavelength, and d is an element to element spacing of the receiving antennas 6 through 11.

Thereafter, the direction calculation unit 33 extracts a peak direction θ in which the MUSIC spectrum becomes a peak (step S8). Specifically, when the MUSIC spectrum in the direction of interest becomes larger than MUSIC spectra in the direction before and after that MUSIC spectrum, the direction thereof is calculated as a peak direction.

The peak directions extracted in this manner are determined as the direction θ of the target 40 in order from the largest to the smallest MUSIC spectrum among the peak directions. In the example of FIG. 4, θ1 and θ2 are calculated as the directions θ of two target components.

Note that the steps S5 through S8 are the basic processing of the MUSIC, which has already been published in a variety of well-known documents, and hence the details thereof are omitted here.

Finally, the target detection unit 1 determines whether calculations for the number of targets counted in step S4 have been completed (step S9), and when it is determined that the calculations have not yet been completed as (that is, NO), a return is made to step S5 where the processing in steps S5 through step S8 is executed in a repeated manner.

On the other hand, when it is determined in step S9 that calculations for the number of targets have been completed (that is, YES), the distance R, the relative speed V or the direction θ for each target component of the entire target 40 is output to an unillustrated external device as target information.

As described above, according to the first embodiment of the present invention, the target detection unit 1 includes the channel to channel integration unit 30 that integrates, at each of the same frequencies, the beat frequency spectra for the plurality of channels in the form of frequency analysis results of the beat signals for the plurality of channels which have been calculated in a predetermined time range, the peak detection unit 31 that detects the peak beat frequencies fbu, fbd from the channel to channel integration beat frequency spectra integrated by the channel to channel integration unit 30, the distance and relative speed calculation unit 32 that calculates the distance R and the relative speed V of the target 40 from the channel to channel integration beat frequency spectra integrated by the channel to channel integration unit 30, and the direction calculation unit 33 that calculates the direction θ of the target 40 from the beat frequency spectra for the plurality of channels.

In addition, the direction calculation unit 33 applies not DBF synthetic processing but super-resolution direction-of-arrival estimation processing (MUSIC method) as a method of calculating the direction θ of the target 40. As a result, a high resolution can be obtained without changing the constructions of the transmitting antenna 5 and the receiving antennas 6 through 11.

The channel to channel integration unit 30 performs DBF synthetic processing on the beat frequency spectra for the plurality of channels, whereby even if a peak of the beat frequency spectrum resulting from the target 40 is buried in the beat frequency spectra before the DBF synthetic processing, the gain of the signals can be improved by performing the DBF synthetic processing over the entire range of the frequencies. Accordingly, the detection performance of the target 40 can be improved, thus making it possible to detect a peak beat frequency in a correct manner.

In addition, the direction calculation unit 33 calculates the direction θ of the target 40 by calculating the angular spectrum of only the peak beat frequency resulting from the target 40 in the beat frequency spectra before the DBF synthetic processing. Accordingly, it is possible to decrease the calculation load in comparison with the case in which the direction θ of the target 40 is obtained by calculating the angular spectrum over the entire frequency range. Here, note that at least one of the peak detection unit 31 and the distance and relative speed calculation unit 32 can also be omitted.

Although in the foregoing description, the channel to channel integration in the channel to channel integration unit 30 is carried out according to the DBF synthetic processing, the amplitudes of the beat frequency spectra for the six channels may instead be added to one another.

In this case, the channel to channel integration is obtained by calculating the amplitude of each channel i from an in-phase component Ii and a quadrature component Qi (i=1, . . . , 6) of predetermined frequency in the beat frequency spectra for the six channels, and adding the amplitudes thus calculated to one another, as shown in the following expression (5).

$$\text{Channel to Channel Integration} = \sum_{i=1}^{6} \sqrt{(Ii^2 + Qi^2)} \quad (5)$$

Thus, according to the processing of adding the amplitudes of the beat frequency spectra for the six channels at each of the same frequencies, the calculation load can be reduced in comparison with the DBF synthetic processing of the Fourier transform at each of the same frequencies in the spatial axis direction.

In addition, when the channel to channel integration is carried out, electric powers of the beat frequency spectra may be added to one another instead of the amplitudes of the beat frequency spectra being added to one another.

Embodiment 2

Figure 5:
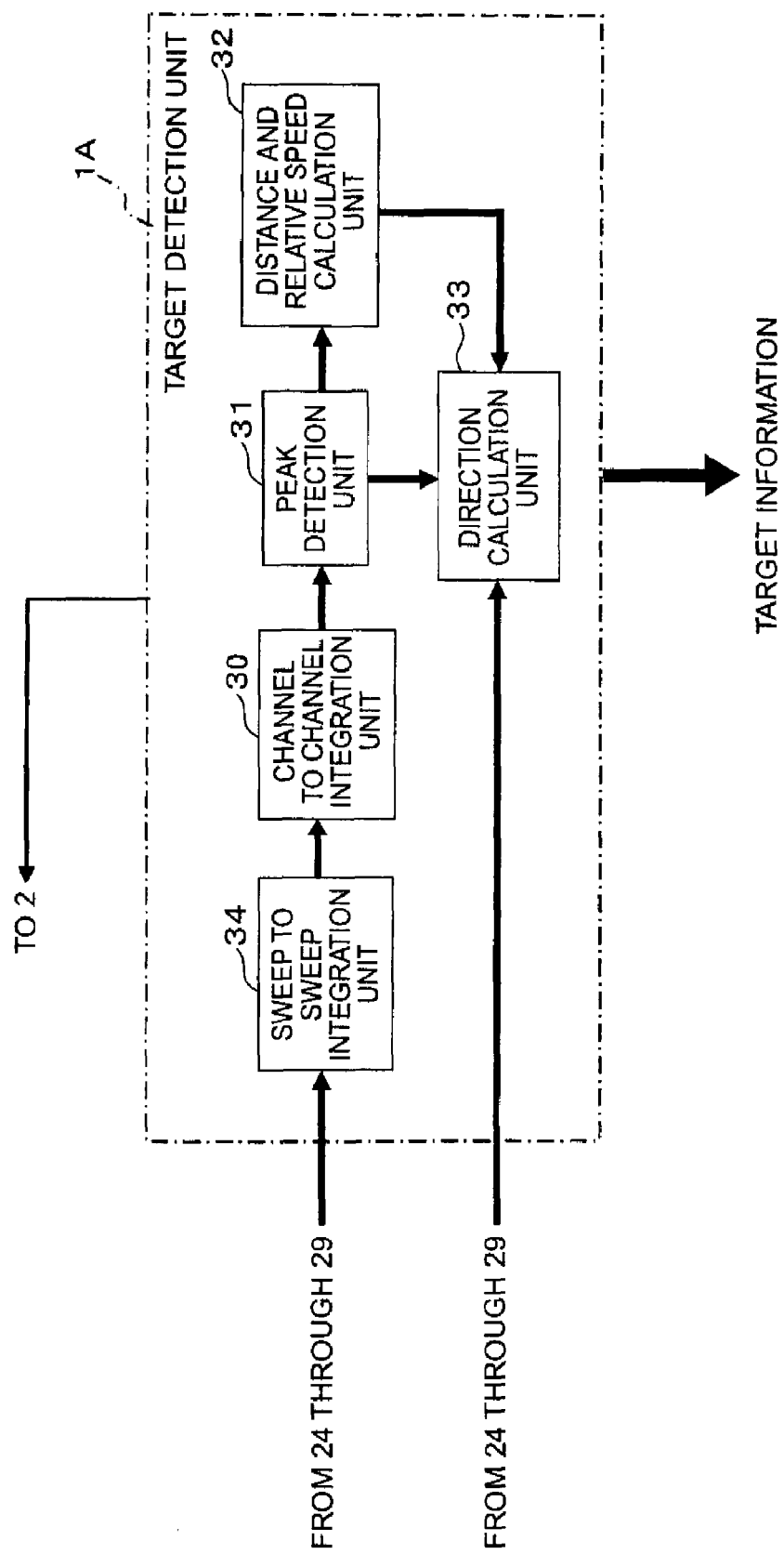
FIG. 5 is a block diagram showing a target detection unit of a radar apparatus according to a second embodiment of the present invention.

In the above-mentioned first embodiment (FIG. 1), the frequency analysis results from the FFT calculators 24 through 29 are directly input to the channel to channel integration unit 30 in the target detection unit 1, they may be input to a sweep to sweep integration processing unit 30 between sweeps as shown in FIG. 5 after through a sweep to sweep integration unit 34.

FIG. 5 is a block diagram that shows a target detection unit 1A of a radar apparatus according to a second embodiment of the present invention, which is the same in construction as that in the above-mentioned (FIG. 1) except for the additional provision of the sweep to sweep integration unit 34. In addition, the construction of peripheral circuits and the like (not shown) is the same as shown in FIG. 1.

Now, reference will be made to the operation of the target detection unit 1A according to the second embodiment of the present invention as illustrated in FIG. 5 while referring to a flow chart of FIG. 6 and explanatory views of FIG. 7.

Figure 6:
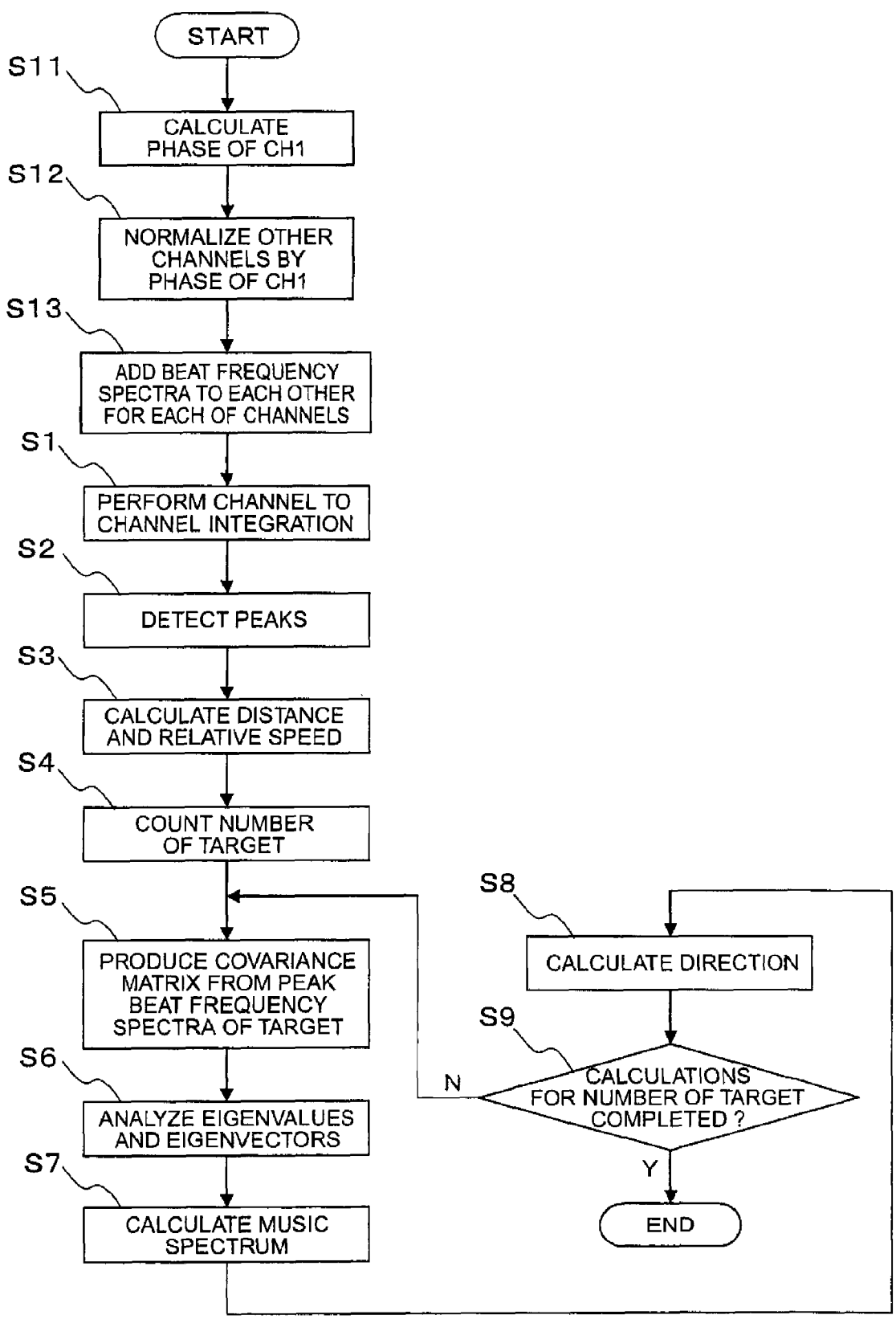
FIG. 6 is a flow chart illustrating the processing of the target detection unit according to the second embodiment of the present invention.

In FIG. 6, steps S1 through S9 are processes similar to those as referred to above (see FIG. 2), and hence a detailed explanation thereof is omitted here. Steps S11 through S13 inserted before step S1 are the processing which is carried out by the sweep to sweep integration unit 34, and which is sweep to sweep integration processing that adds the beat frequency spectra calculated in a plurality of time ranges to one another in complex numbers while leaving their phase information as it is.

First of all, the sweep to sweep integration unit 34 calculates the phase of channel CH1 from the frequency analysis result of the beat signals for the plurality of channels (beat frequency spectra for the plurality of channels) (step S11).

Figure 7:
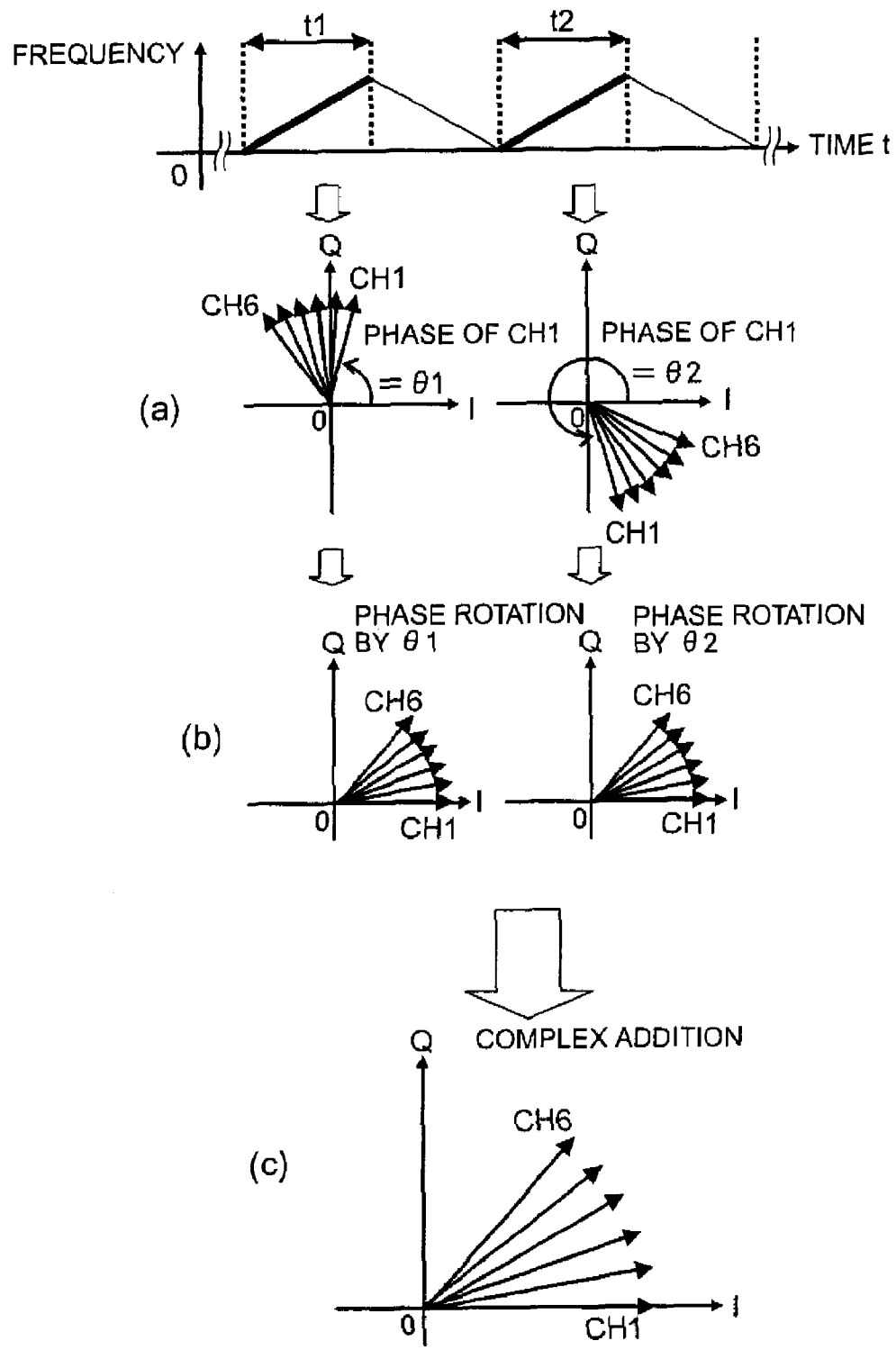
FIG. 7 is explanatory views showing the processing of sweep to sweep integration according to the second embodiment of the present invention.

Specifically, the phases θ1, θ2 of channel CH1 are respectively calculated, as shown in (a) of FIG. 7 in the beat frequency spectra for the six channels (CH1 through CH6) obtained in two time ranges t1, t2 in up zones (step S11). In this regard, note that in (a) through (c) of FIG. 7, the axis of abscissa represents an in-phase component I, and the axis of ordinate represents a quadrature component Q.

Subsequently, the sweep to sweep integration unit 34 normalizes channels CH2 through CH6 with the phases θ1, θ2 of channel CH1 (step S12).

Specifically, the beat frequency spectra for the six channels obtained in the two time ranges t1, t2 are rotated by the phases θ1, θ2 of channel CH1 in the opposite directions, respectively, so that the phases of the channel CH1 are respectively made equal to "zero", as shown in (b) of FIG. 7.

Then, the sweep to sweep integration unit 34 adds the beat frequency spectra thus rotated to each other for each of the channels CH1 through CH6 in complex numbers (step S13). Specifically, the beat frequency spectra for the six channels obtained in the two time ranges t1, t2 are added to each other for each of the same channels CH1 through CH6 in complex numbers, as shown in (c) of FIG. 7. The addition results thus obtained are input to the channel to channel integration unit 30, and the control flow shifts to the above-mentioned processing (steps S1 through S9).

Hereinafter, the processing similar to the above-mentioned is performed on the beat frequency spectra after the execution of the sweep to sweep integration, whereby the distance R, the relative speed V or the direction θ of the target 40 is calculated.

As described above, the target detection unit 1A according to the second embodiment of the present invention includes the sweep to sweep integration unit 34 that integrates the beat frequency spectra calculated in the plurality of time ranges t1, t2 for each of the same channels in complex numbers, the channel to channel integration unit 30 that integrates, at each of the same frequencies, the beat frequency spectra for the plurality of channels which have been calculated in the predetermined time ranges, the peak detection unit 31 that detects peak beat frequencies fbu, fbd, the distance and relative speed calculation unit 32 that calculates the distance R and the relative speed V of the target 40, and the direction calculation unit 33 that calculates the direction of the target 40 from the beat frequency spectra for the plurality of channels.

The sweep to sweep integration unit 34 adds the beat frequency spectra for the plurality of channels to each other for each of the same channels in complex numbers while leaving their phase information as it is, and the channel to channel integration unit 30 performs DBF synthetic processing on the beat frequency spectra after the execution of the sweep to sweep integration. Accordingly, even if a peak in the beat frequency spectra resulting from the target 40 is buried, it is possible to perform the integration processing with respect to the plurality of time ranges t1, t2. As a result, the detection performance of the target 40 can be further improved as compared with the above-mentioned first embodiment. Here, note that in this case, too, at least one of the peak detection unit 31 and the distance and relative speed calculation unit 32 can be omitted.

In addition, the channel to channel integration unit 30 may calculate the amplitudes or electric powers of the beat frequency spectra after the execution of the sweep to sweep integration, and add them to each other for the plurality of channels and at each of the same frequencies.

Moreover, the sweep to sweep integration unit 34 may calculate the amplitudes or electric powers of the beat frequency spectra, and add them to each other for each of the same channels, and the channel to channel integration unit 30 may add the amplitudes or electric powers of the beat frequency spectra after the execution of the sweep to sweep integration to each other, for the plurality of channels and at each of the same frequencies.

The direction calculation unit 33 may produce a covariance matrix from the beat frequency spectra for the plurality of channels, and calculate the direction θ or the number of target components of the target 40 from the eigenvalues and eigenvectors of the covariance matrix.

Further, the direction calculation unit 33 may produce a covariance matrix from the beat frequency spectra for the plurality of channels calculated in the plurality of time ranges, and calculate the directions θ or the number of target components of the target 40 from the eigenvalues and eigenvectors of the covariance matrix.

Furthermore, the channel to channel integration unit 30 may calculate the amplitudes or electric powers of the beat frequency spectra for the plurality of channels, and add them to each other for the plurality of channels and at each of the same frequencies, and the sweep to sweep integration unit 34 may add the amplitudes or electric powers of the beat frequency spectra after the execution of the channel to channel integration to each other, at each of the same frequencies.

Embodiment 3

Although in the above-mentioned second embodiment (FIG. 5), the sweep to sweep integration unit 34 is inserted at an input side of the channel to channel integration unit 30, it may be inserted at an output side of the channel to channel integration unit 30, so that there is provided the processing of adding, for each of the same beams and at each of the same frequencies, the amplitudes or the electric powers of the beat frequency spectra calculated in a plurality of time ranges after the processing of the channel to channel integration unit 30.

Hereinafter, reference will be made to a radar apparatus according to a third embodiment of the present invention while referring to an explanatory view in FIG. 4 together with FIG. 8. Here, note that the basic construction of the radar apparatus according to the third embodiment of the present invention is as shown in FIG. 1, and the block construction of a target detection unit 1A is such that the channel to channel integration unit 30 and the sweep to sweep integration unit 34 in FIG. 5 are exchanged with each other.

In this case, the channel to channel integration unit 30 performs DBF synthetic processing on the beat frequency spectra for the plurality of channels, and the sweep to sweep integration unit 34 calculates the amplitudes or electric powers of the beat frequency spectra after the execution of channel to channel integration, and adds them to each other for each of the same beams. That is, the amplitudes or electric powers of the beat frequency spectra for a plurality of beams obtained in a plurality of time ranges are added to each other for each of the same beams and at each of the same frequencies.

Figure 8:
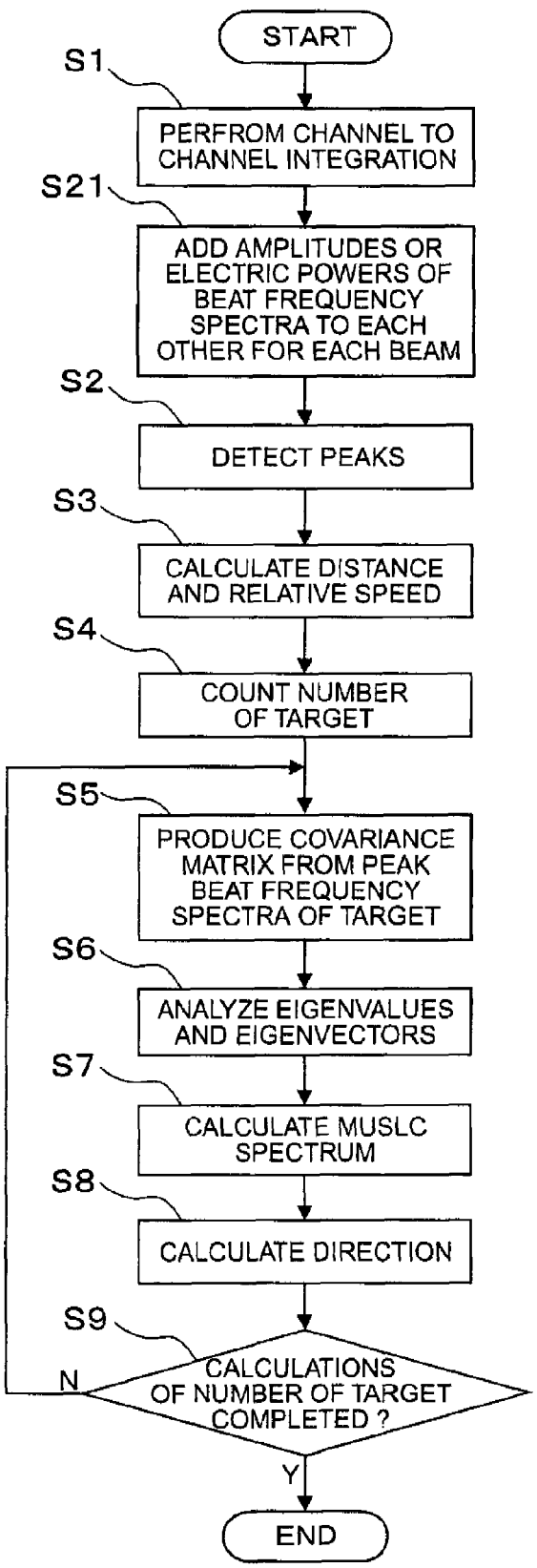
FIG. 8 is a flow chart illustrating the processing of a target detection unit according to a third embodiment of the present invention.

FIG. 8 is a flow chart that illustrates the operation or processing of a target detection unit 1 added by the above-mentioned addition processing according to the third embodiment of the present invention. In FIG. 8, the processing illustrated therein is similar to the above-mentioned processing in FIG. 2 except for step S21 inserted after step S1, and hence an explanation of step S1 to step S9 is omitted. In this case, subsequent to the above-mentioned channel to channel integration processing (step S1), the channel to channel integration unit 30 performs sweep to sweep integration processing.

FIG. 9 is explanatory views that show the addition processing (step S21) which is carried out by the sweep to sweep integration unit 34 for each of the same beams and at each of the same frequencies, wherein (a) and (b) show the amplitudes or electric powers of beat frequency spectra for eight beams (here, beam B1 alone being illustrated) calculated in a first predetermined time range t1 and in a second predetermined time range t2, respectively, in the entire range of frequencies from 0 to maximum (MAX).

In FIG. 9, the amplitudes or electric powers of the beat frequency spectra are added to each other for each of the same beams (e.g., beam B1) and at each of the same frequencies over the entire range of frequencies from 0 to MAX. For example, when focusing on a frequency A as shown in FIG. 9, the amplitude (or electric power) of the frequency A in (a) the time range t1 and that in (b) the time range t2 are added to each other in the same beam (beam 1). The addition results thus obtained by the processing of the sweep to sweep integration unit 34 (step S21) are input to the peak detection unit 31.

Hereinafter, the processing (steps S2 through S9) similar to the above-mentioned (see FIG. 2 and FIG. 6) is performed on the amplitudes or electric powers of the beat frequency spectra after the sweep to sweep integration thereof, and the distance R, the relative speed V or the direction θ of the target 40 is calculated.

As described above, according to the third embodiment of the present invention, after the channel to channel integration unit 30 in the target detection unit 1, provision is made for the processing (step S21) in which the amplitudes or electric powers of the beat frequency spectra for a plurality of beams obtained in a plurality of time ranges are added to each other for each of the same beams and at each of the same frequencies. Accordingly, even if a peak of the beat frequency spectra resulting from the target 40 is buried, the detection performance of the target 40 can be further improved by performing integration only in the plurality of time ranges, as compared with the above-mentioned first embodiment.

Embodiment 4

Although not particularly referred to in the above-mentioned first through third embodiments, a plurality of covariance matrices may be produced in the direction calculation unit 33.

Figure 10:
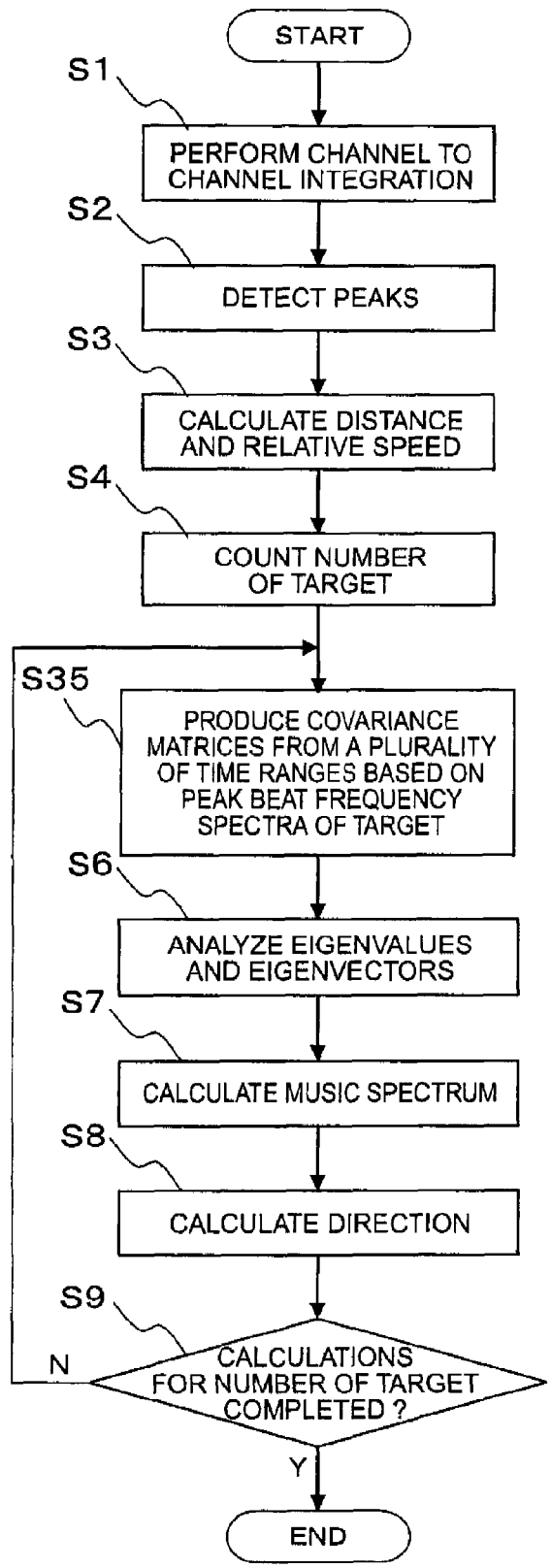
FIG. 10 is a flow chart illustrating the operation of a target detection unit according to a fourth embodiment of the present invention.

FIG. 10 is a flow chart that illustrates the operation or processing of a target detection unit 1 according to a fourth embodiment of the present invention. In FIG. 10, steps S1 through S4 and S6 through S9 are processes similar to those as referred to above (see FIG. 1), and the flow chart of FIG. 10 is different from that of FIG. 1 in that it includes, in place of step S5 in FIG. 1, step S35 in which the processing of producing a plurality of covariance matrices for use with a MUSIC method from a plurality of time ranges is executed.

In this case, following the above-mentioned target number counting processing (step S4), the direction calculation unit 33 (see FIG. 1) in the target detection unit 1 produces a plurality of covariance matrices from a plurality of time ranges based on the peak beat frequency spectra of the target 40 (step S35), and then it shifts to the above-mentioned step S6.

Hereinafter, similarly as stated above, the eigenvalue decomposition of the covariance matrices is performed to obtain eigenvectors, from which a MUSIC spectrum is calculated, and the direction θ of the target 40 is calculated. That is, the direction calculation unit 33 produces covariance matrices with respect to the beat frequency spectra for a plurality of channels calculated in the plurality of time ranges, and calculates the directions or the number of target components of the target 40 from the eigenvalues and eigenvectors of the covariance matrices.

In addition, the direction calculation unit 33 produces a covariance matrix from the beat frequency spectrum of a peak beat frequency fbu (see FIG. 3) and the beat frequency spectrum of a peak beat frequency fbd (see FIG. 3).

In general, in super-resolution direction-of-arrival estimation processing, it is known that if the number of data (snap shots) of beat frequency spectra to produce a covariance matrix is present for a plurality of time ranges, the direction θ of the target 40 can be estimated with a higher degree of precision.

The direction calculation unit 33 according to the fourth embodiment of the present invention produces a covariance matrix Rc for use with the MUSIC method from two beat frequency spectra, as shown by the following expression (6).

$$R_c = \begin{bmatrix} X_1 \cdot X_1^* & X_1 \cdot X_2^* & \ldots & X_1 \cdot X_6^* \\ X_2 \cdot X_1^* & X_2 \cdot X_2^* & \ldots & X_2 \cdot X_6^* \\ \vdots & \vdots & \ddots & \vdots \\ X_6 \cdot X_1^* & X_6 \cdot X_2^* & \ldots & X_6 \cdot X_6^* \end{bmatrix} + \begin{bmatrix} Y_1 \cdot Y_1^* & Y_1 \cdot Y_2^* & \ldots & Y_1 \cdot Y_6^* \\ Y_2 \cdot Y_1^* & Y_2 \cdot Y_2^* & \ldots & Y_2 \cdot Y_6^* \\ \vdots & \vdots & \ddots & \vdots \\ Y_6 \cdot Y_1^* & Y_6 \cdot Y_2^* & \ldots & Y_6 \cdot Y_6^* \end{bmatrix} \quad (6)$$

Here, note that in expression (6) above, Xi represents a beat frequency spectrum before the DBF synthetic processing of a peak beat frequency fbu in the i-th channel CHi (i=1, . . . , 6), and Xi* represents a complex conjugate of the beat frequency spectrum Xi. Also, Yi represents a beat frequency spectrum before the DBF synthetic processing of a peak beat frequency fbd in the i-th channel CHi (i=1, . . . , 6), and Yi* represents a complex conjugate of the beat frequency spectrum Yi.

As described above, the direction calculation unit 33 according to the fourth embodiment of the present invention increases the number of data of the beat frequency spectra (snap shots), and produces covariance matrices from the beat frequency spectra calculated in two time ranges, in step S35. As a result, the detection θ of the target 40 can be calculated with a much higher degree of precision, as compared with the above-mentioned first through third embodiments.

In this regard, if, by providing, as a plurality of time ranges, (1) only a plurality of up zones in each of which the frequency rises along with the elapse of time or (2) only a plurality of down zones in each of which the frequency falls along with the elapse of time or (3) a plurality of sets of up zones and down zones, the number of data of the beat frequency spectra (snap shots) is increased and covariance matrices are produced from the beat frequency spectra calculated in the plurality of time ranges, it is possible to calculate the direction θ of the target 40 with a much higher degree of precision.

In addition, although in the above-mentioned first through fourth embodiments, there is shown, by way of example, a case of using six receiving antennas 6 through 11 (see FIG. 1), it is needless to say that the present invention can be similarly applied even with the use of any other number of receiving antennas.

Although there is also shown, by way of example, a case in which the MUSIC method is used for the direction calculation processing of the target 40 by means of the direction calculation unit 33, the present invention can also be applied to radar apparatuses using other methods such as, for example, a unitary MUSIC method, an ESPRIT method, a unitary ESPRIT method, etc.

In particular, in case where the unitary MUSIC method or unitary ESPRIT method is used, the real part of a covariance matrix need only be used, so the amount of calculations can be reduced.

Further, although there is shown, by way of example, a case in which an FM-CW method is used, as the method of detecting the distance R and the relative speed V of the target 40, the present invention can also be applied to a radar apparatus that modulates a transmitting signal by delimiting or dividing it in a pulse-like manner.

While the invention has been described in terms of preferred embodiments, those skilled in the art will recognize that the invention can be practiced with modifications within the spirit and scope of the appended claims.

What is claimed is:

1. A radar apparatus comprising:
   a transmitting unit that emits a transmitting signal;
   a receiving unit that receives a reflection signal, which is said transmitted signal reflected from a target, by means of an array antenna having a plurality of channels;
   a mixing unit that mixes said transmitting signal and reception signals received by said plurality of channels of said receiving unit, respectively, to obtain beat signals for the plurality of channels;
   a frequency analysis unit that frequency analyzes said beat signals for the plurality of channels, respectively; and
   a target detection unit that calculates a distance, a relative speed, or a direction of said target based on frequency analysis results for said plurality of channels;
   wherein said target detection unit comprises:
      a channel to channel integration unit that integrates, at each of the same frequencies, beat frequency spectra for the plurality of channels in the form of frequency analysis results of said beat signals for the plurality of channels which are calculated in a predetermined time range; and
      a direction calculation unit that calculates the direction of said target from said beat frequency spectra for the plurality of channels,
   wherein
      said target detection unit further comprises:
         a sweep to sweep integration unit that integrates beat frequency spectra calculated in a plurality of time ranges for each of the same channels, and
   wherein
      said sweep to sweep integration unit adds said beat frequency spectra for the plurality of channels to each other for each of the same channels in complex numbers while leaving their phase information as it is; and
      said channel to channel integration unit performs digital beam forming synthetic processing on said beat frequency spectra after the sweep to sweep integration thereof.

2. A radar apparatus comprising:
   a transmitting unit that emits a transmitting signal;
   a receiving unit that receives a reflection signal, which is said transmitted signal reflected from a target, by means of an array antenna having a plurality of channels;
   a mixing unit that mixes said transmitting signal and reception signals received by said plurality of channels of said receiving unit, respectively, to obtain beat signals for the plurality of channels;
   a frequency analysis unit that frequency analyzes said beat signals for the plurality of channels, respectively; and
   a target detection unit that calculates a distance, a relative speed, or a direction of said target based on frequency analysis results for said plurality of channels;
   wherein said target detection unit comprises:
      a channel to channel integration unit that integrates, at each of the same frequencies, beat frequency spectra for the plurality of channels in the form of frequency analysis results of said beat signals for the plurality of channels which are calculated in a predetermined time range; and
      a direction calculation unit that calculates the direction of said target from said beat frequency spectra for the plurality of channels,
   wherein
      said target detection unit further comprises:
         a sweep to sweep integration unit that integrates beat frequency spectra calculated in a plurality of time ranges for each of the same channels, and
   wherein
      said sweep to sweep integration unit adds said beat frequency spectra for the plurality of channels to each other for each of the same channels in complex numbers while leaving their phase information as it is; and
   said channel to channel integration unit calculates amplitudes or electric powers with respect to said beat frequency spectra after the sweep to sweep integration thereof, and adds said amplitudes or electric powers to each other for the plurality of channels and at each of the same frequencies.

3. A radar apparatus comprising:
   a transmitting unit that emits a transmitting signal;
   a receiving unit that receives a reflection signal, which is said transmitted signal reflected from a target, by means of an array antenna having a plurality of channels;
   a mixing unit that mixes said transmitting signal and reception signals received by said plurality of channels of said receiving unit, respectively, to obtain beat signals for the plurality of a frequency analysis unit that frequency analyzes said beat signals for the plurality of channels, respectively; and a target detection unit that calculates a distance, a relative speed, or a direction of said target based on frequency analysis results for said plurality of channels;

wherein said target detection unit comprises:

a channel to channel integration unit that integrates, at each of the same frequencies, beat frequency spectra for the plurality of channels in the form of frequency analysis results of said beat signals for the plurality of channels which are calculated in a predetermined time range; and a direction calculation unit that calculates the direction of said target from said beat frequency spectra for the plurality of channels, wherein said target detection unit further comprises:

a sweep to sweep integration unit that integrates beat frequency spectra calculated in a plurality of time ranges for each of the same channels, and wherein said sweep to sweep integration unit calculates the amplitudes or electric powers of said beat frequency spectra, and adds said amplitudes or electric powers to each other for each of the same channels; and said channel to channel integration unit adds the amplitudes or electric powers of said beat frequency spectra after the sweep to sweep integration thereof to each other for the plurality of channels and at each of the same frequencies.

4. A radar apparatus comprising:

a transmitting unit that emits a transmitting signal;

a receiving unit that receives a reflection signal, which is said transmitted signal reflected from a target, by means of an array antenna having a plurality of channels a mixing unit that mixes said transmitting signal and reception signals received by said plurality of channels of said receiving unit, respectively, to obtain beat signals for the plurality of channels;

a frequency analysis unit that frequency analyzes said beat signals for the plurality of channels, respectively; and a target detection unit that calculates a distance, a relative speed, or a direction of said target based on frequency analysis results for said plurality of channels;

wherein said target detection unit comprises:

a channel to channel integration unit that integrates, at each of the same frequencies, beat frequency spectra for the plurality of channels in the form of frequency analysis results of said beat signals for the plurality of channels which are calculated in a predetermined time range; and a direction calculation unit that calculates the direction of said target from said beat frequency spectra for the plurality of channels, wherein said target detection unit further comprises:

a sweep to sweep integration unit that integrates beat frequency spectra calculated in a plurality of time ranges for each of the same channels, and wherein said channel to channel integration unit performs digital beam forming synthetic processing on said beat frequency spectra for the plurality of channels; and said sweep to sweep integration unit calculates amplitudes or electric powers with respect to said beat frequency spectra after the channel to channel integration thereof, and adds said amplitudes or electric powers to each other for each of the same channels.

5. A radar apparatus comprising:

a transmitting unit that emits a transmitting signal;

a receiving unit that receives a reflection signal, which is said transmitted signal reflected from a target, by means of an array antenna having a plurality of channels;

a mixing unit that mixes said transmitting signal and reception signals received by said plurality of channels of said receiving unit, respectively, to obtain beat signals for the plurality of channels;

a frequency analysis unit that frequency analyzes said beat signals for the plurality of channels, respectively; and a target detection unit that calculates a distance, a relative speed, or a direction of said target based on frequency analysis results for said plurality of channels;

wherein said target detection unit comprises:

a channel to channel integration unit that integrates, at each of the same frequencies, beat frequency spectra for the plurality of channels in the form of frequency analysis results of said beat signals for the plurality of channels which are calculated in a predetermined time range; and a direction calculation unit that calculates the direction of said target from said beat frequency spectra for the plurality of channels, wherein said target detection unit further comprises:

a sweep to sweep integration unit that integrates beat frequency spectra calculated in a plurality of time ranges for each of the same channels, and wherein said channel to channel integration unit calculates amplitudes or electric powers with respect to said beat frequency spectra for the plurality of channels, and adds said amplitudes or electric powers to each other for the plurality of channels and at each of the same frequencies; and said sweep to sweep integration unit adds the amplitudes or electric powers of said beat frequency spectra after the channel to channel integration thereof to each other for each of the same channels.

\* \* \* \* \*